United States Patent [19]

Lulejian et al.

[11] 4,313,750

[45] Feb. 2, 1982

[54] ELECTRONICALLY CONTROLLED ROBOT FOR HANDLING GLASSWARE

[75] Inventors: Donald A. Lulejian, Cornwells Heights; Alphonse W. Faure, Warminster; Eugene F. Fijalkowski, Philadelphia, all of Pa.

[73] Assignee: CSS International Corporation, Philadelphia, Pa.

[21] Appl. No.: 186,440

[22] Filed: Sep. 12, 1980

[51] Int. Cl.³ .............................................. C03B 9/40
[52] U.S. Cl. ..................................... 65/160; 65/163; 364/473; 414/730
[58] Field of Search ................ 414/730; 65/160, 163, 65/DIG. 13; 364/104, 473

[56] References Cited

U.S. PATENT DOCUMENTS

| | | | |
|---|---|---|---|
| 3,476,266 | 11/1969 | Devol | 414/730 |
| 3,851,769 | 12/1974 | Noguchi et al. | 414/730 X |
| 3,951,271 | 4/1976 | Mette | 414/730 X |
| 4,007,028 | 2/1977 | Bublitz et al. | 65/163 |
| 4,203,752 | 5/1980 | Becker et al. | 65/163 |
| 4,218,172 | 8/1980 | Freund | 414/730 |
| 4,247,317 | 1/1981 | Wood et al. | 65/163 X |

*Primary Examiner*—Arthur D. Kellogg
*Attorney, Agent, or Firm*—John J. Simkanich

[57] ABSTRACT

An electrically operated and electronically controlled hollow glass article (glassware) handling apparatus responsive to I.S. machine synchronous operation may have mechanical robot operation consistent with, and identical to, ideal mechanical cam driven glassware conveyor delivery apparatus (GCDA) operation and may be adjustable for varying pushout cylinder time-position characteristics and automatically may correct for loss of synchronization and loss of initial or "home" position reference.

58 Claims, 10 Drawing Figures

FIG. 6. FIRST SECTION

FIG. 6. SECOND SECTION

ELECTRONICALLY CONTROLLED ROBOT FOR HANDLING GLASSWARE

BACKGROUD OF THE INVENTION

This invention relates to the glassware delivery and conveying apparatus used in glassware manufacturing, and particularly to the operation of that component of the glassware delivery and conveying apparatus which transfer hot, newly formed glassware articles from the dead plate of the individual section conveying system (I.S. dead plate) to the moving I.S. conveyor leading to the lehr.

Prior art teachings relating to glassware manufacturing delivery and conveying apparatus, and particularly to a mechanism for transferring a hot, newly formed glassware article from the dead plate to a moving I.S. conveyor, have disclosed mechanical and mechanically operated apparatus often called "pushouts" for this function. Patents which teach such apparatus include Faure, U.S. Pat. No. 3,599,537, Faure, U.S. Pat. No. 3,595,365, Dahms, U.S. Pat. No. 2,556,469, Rowe, U.S. Pat. No. 3,249,200 and Rydlewicze, U.S. Pat. No. 3,249,201.

These patents have taught "pushout" structures which have included a vertically extending oscillating shaft, upon which has been mounted a hydraulically operated "pushout" cylinder. This cylinder has robot arm or fingers on the piston thereof. A cam shaft driven from a mechanical or electrical motor power source which is synchronous to the entire glass making I.S. machine has been utilized as a timing and drive shaft to control the position and rate of rotation of the rotational "pushout" cylinder support shaft, as well as the extension and retraction operation of the robot fingers' piston. A cam mounted on the timing shaft translates rotation into mechanical operation of the pushout support shaft and cylinder apparatus. The exact position of this cam and the shape of the cam lobe governs the timing sequences of the pushout and its operational characteristics, i.e., the complex path transversed by the robot fingers' with respect to time. Such mechanical cam operated pushout apparatus utilizes the teachings of Faure, U.S. Pat. No. 3,599,537.

These centrally powered, mechanical cam pushouts have certain disadvantages inherent to their mechanical structure and operation. These disadvantages include difficulty in modifying the pushout operation when the glassware produced is varied or other manufacturing specifications are changed. The changing of the time-position performance characteristics for a mechanical cam pushout having a mechanical timing cam or equivalent or substitute mechanical drive structure therefor such as taught by Becker et al, U.S. Pat. No. 4,203,752, has required the physical replacement or alteration of this cam or equivalent structure. This involves the mechanical disassembly and reassembly of the apparatus, a time-consuming job. Moreover, the mechanic must take care regarding the exact position of the cam on the timing shaft which is very critical. The actual breakdown of a cam lobe into component parts is often necessary as part of a replacement operation.

Another more obvious disadvantage of such a mechanical cam pushout apparatus is that as it becomes worn, through length of service, etc., its operation deviates from the ideal or new condition parameters. This increases the occurrence of accidents. Moreover, mechanical parts contain manufacturing errors and tolerances which contribute to lack of accuracy and repeatability, this in turn contributes to deviation in bottle spacing on the I.S. conveyor.

Another disadvantage is that any accident or mechanical deformation which causes the robot fingers, i.e., shaft position, to be permanently or semi-permanently jarred does cause a physical misalignment which could cause an accident in the transferring of the glassware or improper handling operation, as the timing sequence of the pushout cylinder would be "off" thus increasing the likelihood of breakage or the misposition of glassware on the conveyor.

It is desirable to provide a pushout apparatus which does not possess the inherent problems of the prior art mechanical devices.

An object of the present invention is to provide an electrically operated and electronically controlled glassware conveyor delivery apparatus.

A second object is to provide such an electrical glassware conveyor delivery apparatus whose operating characteristics are electronically adjustable.

A further object is to provide such an electronically adjustable electrically operated glassware conveyor delivery apparatus whose accuracy of operation does not degrade with length of service, which does not use a mechanical cam and which eliminates cumulative mechanical errors, and which is readily interchangeable between sections of an I.S. conveyor system or between conveyor systems.

A further object is to provide such an electrical glassware conveyor delivery apparatus which is capable of detection and correction for loss of synchronization of operation and which is capable of detection and correction to an initial or "home" dead plate position.

An even further object is to provide such an electronically controlled glassware conveyor delivery apparatus pushout with greater than 0.1° of accuracy of rotational position.

SUMMARY OF THE INVENTION

An electrically operated, electronically controlled camless glassware conveyor delivery apparatus (GCDA) may operate in response to sequential timing signals indicative of I.S. machine synchronous operation. A mechanically operated electrical signal generator may be incorporated to transform I.S. synchronous operation from a point on the I.S. machine into electrical information representing cyclic I.S. machine operation in angular degrees. An electronic control circuit may utilize this electrical information representing angular rotation to provide control signals to drive an electric motor operated GCDA.

A transfer drive may be utilized for coupling the motor to the pushout cylinder support unit of the GCDA for pivoting a hydraulically operated cylinder and attachments (robot fingers).

The electronic control circuit may include a read only memory (ROM) containing pushout support shaft rotational time-position instructions for GCDA operation.

Additional circuitry may interrogate actual cylinder support shaft position for loss of synchronization as well as loss of improper initial (home) position and correction thereof.

Identical, individual, electrically operated and electronically controlled GCDA units may be ganged together for multisection machine operation. These individual electronic GCDA units each containing the structure recited above may receive synchronous angular information from a common signal generator connected to the multisection I.S. machine feeder and each individual electronic GCDA have its operative cycle initiated by a sequence of operation instruction from a central operator console.

DESCRIPTION OF THE DRAWINGS

The novel features and advantages of this invention will be readily understood from a reading of the following detailed description of the invention in conjunction with the attached drawings in which like numerals refer to like elements, and wherein.

DETAILED DESCRIPTION OF THE INVENTION

Figures 1, 2:
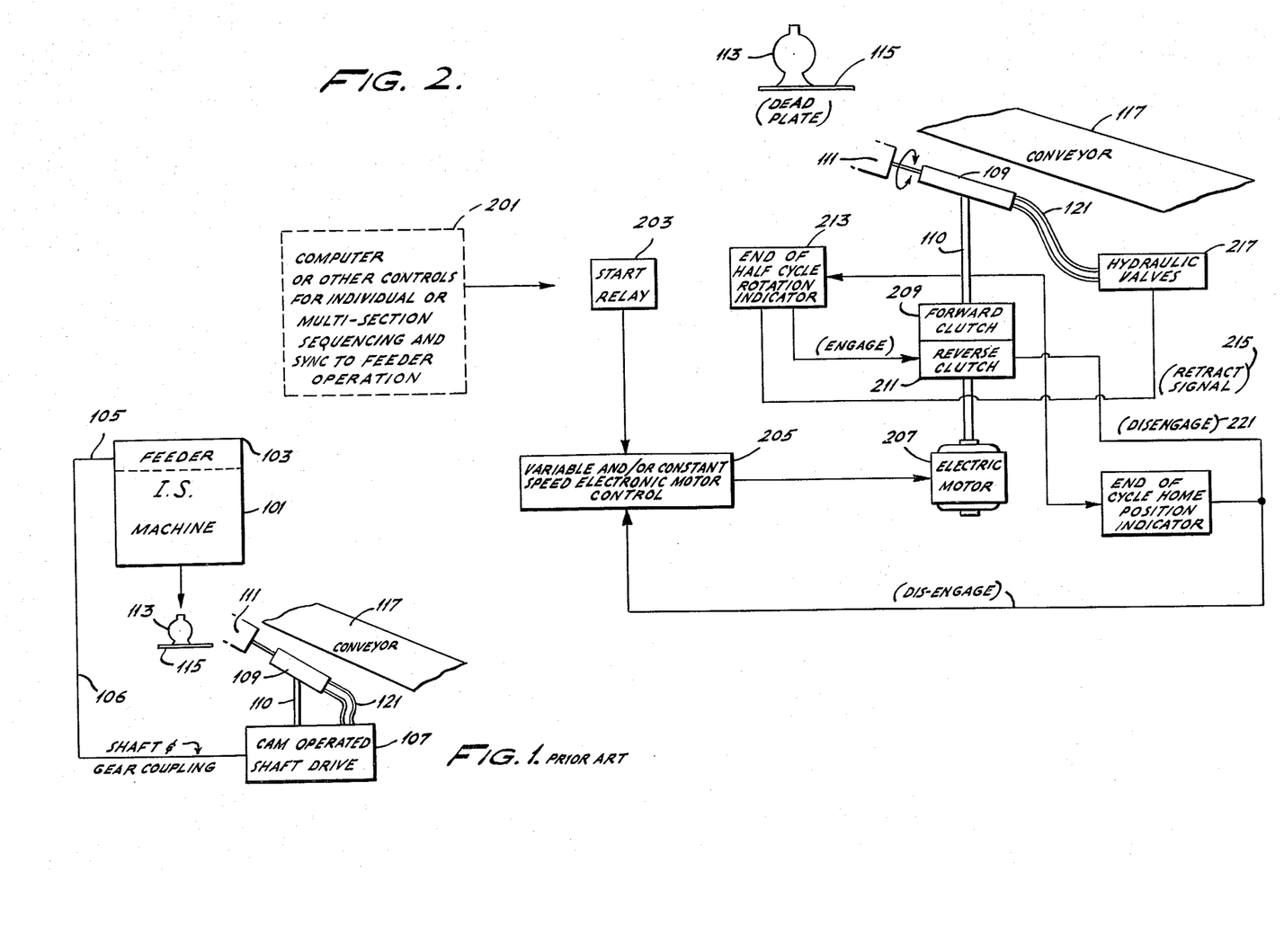
FIG. 1 is a block diagram representation of a mechanical cam operated GCDA previously used in the art.
FIG. 2 is a block diagram representation of a simple circuit for the individual GCDA of the subject invention.

A glassware conveyor delivery apparatus (GCDA) is a machine which has been used in the glass industry to remove a newly formed glassware object deposited upon a dead plate of an I.S. conveyor. The pushout moves the object to a moving conveyor passing from the bottle machine area to a lehr where the glass object is cured. Glassware manufacturing machines or (bottles) I.S. machines 101, FIG. 1, are normally driven by electric motors, which electric motors are normally also connected to drive the glassware making materials feeder 103 to the I.S. machine 101. A feeder drive shaft 105 which is driven in synchronism with the cyclic operation of the I.S. machine 101 is normally coupled through shaft and gear drive 106 to a cam operated pushout drive system 107. This cam driven system 107 operates to cause a hydraulic pushout cylinder 109 to pivot on a vertical support shaft 110. A mechanical arm or fingers 111 are positioned on the piston of the pushout cylinder 109 thereof forming a robot arm. The cam driven system 107 normally controls the hydraulic operation of the cylinder 109 via lines 121 causing its piston extension and retraction. Together, this operation extends the fingers 111 to engage a bottle or other glassware 113 on the depository or dead plate 115, apart from the bottle machine 101, and moves it to an I.S. conveyor 117.

The precise time-position operation of the cylinder 109, and the extension of the piston mounted fingers 111, as well as, the rotation of the shaft 110 upon which the cylinder 109 rotates, are controlled solely by the shape, size and position of the cam on the shaft within drive 109. This cam determines the character of operation of the pushout regarding initiation and and completion of robot finger 111 operation, as well as, time-position operation, i.e., speed.

The invention at hand is directed to an electronically driven and electronically controlled GCDA wherein the cylinder 109, FIG. 2, as well as its piston mounted fingers 111, rotating support shaft 110 and hydraulic lines 121 are identical to the prior art teachings of Faure U.S. Pat. No. 3,595,365. The apparatus operates in the same environment with the same I.S. machine 101, I.S. machine 101, I.S. conveyor 117, glassware 113 deposited upon the dead plate 115 of the I.S. conveyor system and feeder 103 drive 105.

Electrical information, FIG. 2, is received from a computer or other controller for individual section or multisection sequencing 201, and is synchronized to feeder 103 operation. This information 201 activates a start relay 203 which feeds a variable or constant speed electronic motor controller circuit 205. This controller circuit 206 in turn drives an electric motor 207.

The electric motor 207 is connected to drive the cylinder support shaft 110 through the coupling of the motor shaft 208 via a combination forward drive clutch 209 and reverse drive clutch 211 structure.

An end of half cycle rotation indicator 213 monitors the rotation of the support shaft 110 to engage the reverse direction clutch when the cylinder support shaft 110 has reached the end of its swing arc to cause the motor 207 to return the cylinder 109 to its initial or home position. The end of half cycle indicator also sends a retract signal 215 to the hydraulic valve controls 217 for the hydraulic lines 121.

An end of cycle or home position indicator 219 disengages 221 the reverse clutch 211 and the electronic motor control circuit 205 to wait for the next operating cycle.

Figure 3:
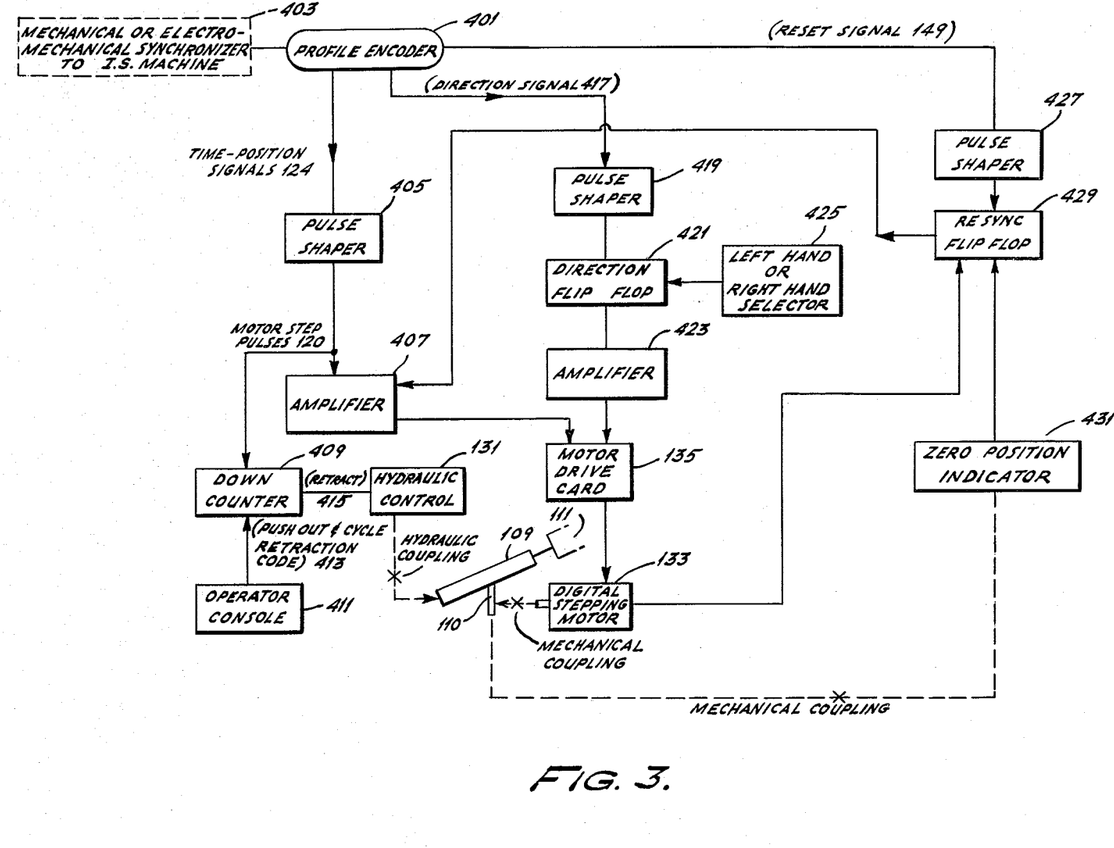
FIG. 3 is a block diagram of a circuit having a profile encoder and a digital stepping motor for the electronic GCDA of the subject invention.

The electrically driven and electronically controlled GCDA can also be implemented by an electronically controlled circuit utilizing a profile encoder 401 tied to a mechanical or electromechanical synchronization point (synchronizer) of an I.S. machine 403, FIG. 3. It is understood that where speed reductions are needed for proper interfacing of this embodiment or others described herein, with a synchronization point of an I.S. machine, such reductions through gearing and other well known means are incorporated. The profile encoder 401 provides support shaft 110 rotational time-position signals 124 in synchronization with the I.S. machine. These signals 124 comprise a train of essentially electrical impulse signals which are shaped by a pulse shaper 405.

The motor step pulses 128 from the first pulse shaper 405 are fed to a first amplifier 407 and to a down counter 409. The first amplifier 407 is connected to a commercially available motor drive card 135 for a commercially available digital stepping motor 133 connected to that drive card 135.

An operator console 411 provides a pushout cylinder 109 retraction code 413 to the down counter 409. When the down counter 409 reaches zero count, a retract signal 415 is sent from that down counter 409 to operate a hydraulic control 131 for retracting the cylinder fingers 111.

A direction signal 417 is also generated by the profile encoder 401. This direction signal 417 is fed through a second pulse shaper 419 which feeds a flip-flop 421 which flip-flop 421 is connected to a second amplifier 423. This second amplifier 423 is also connected to the motor drive card 135 to cause the digital stepping motor 133 to rotate the pushout cylinder 109 via the support shaft 110 first in one direction during the first-half cycle of operation and then in the opposite direction during the second-half or return cycle.

A left hand or right hand operation selector 426 sets the direction flip-flop to establish clockwise or counter-clockwise first-half cycle rotation.

The profile encoder also provides a reset signal 149 which is passed through a third pulse shaper 427 to a resynchronization flip-flop 429. This resynchronization flip-flop 429 receives signals from the digital stepping motor 133 and a zero position indicator 431. The zero position indicator is coupled to the support shaft 110 to detect its position relative to the "home" or zero or initial position. The output from the resynchronization flip-flop 429 feeds the first amplifier 407. These components act to return the support shaft 110 and cylinder 109 to their initial position.

Figure 3A:
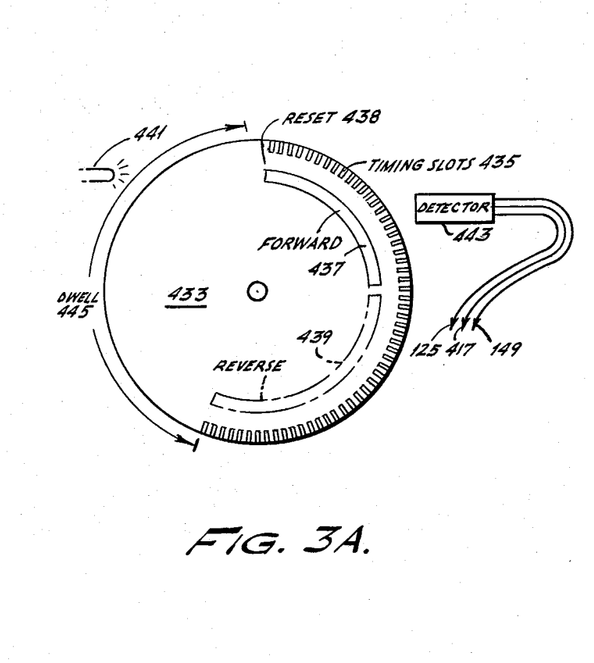
FIG. 3a illustrates a timing disk electro-optical generator for the profile encoder of FIG. 3.

The profile encoder 401 of FIG. 3 can be implemented with a timing disk 433, FIG. 3a which is driven mechanically in synchronization with the I.S. machine 101 cyclic operation. This disk can have a series of timing slots 435 cut in its perimeter with a reset 438 being at the beginning of a direction slot 437.

An arcuate slot 437, or the absence thereof 439, defines a second informational position on the disk 433 spaced inwardly from its perimeter, and dictates forward and reverse operation, respectively. A photo-electric system including a source 441 and detector 443 is used to generate the time position signals 124, direction signal 417 and reset signal 149 indicative of the rotation of the disk 433. An absence of slots provides a machine dwell time 445.

Figure 4:
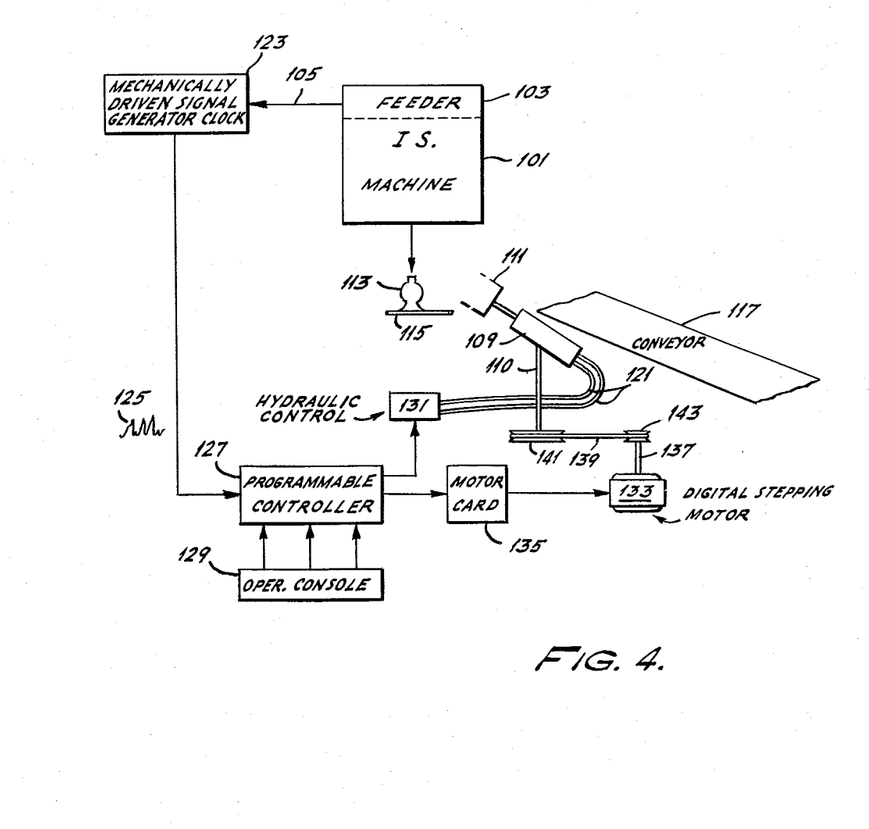
FIG. 4 is a block diagram of a programmable electronic individual GCDA of the subject invention.

The electrically driven and electronically controlled GCDA of the subject invention can more precisely be operated and have its operating parameters easily changed when implemented with programmable control circuitry, FIG. 4. Here, as with the GCDA of FIGS. 2 and 3, the cylinder 109, as well as its piston mounted fingers 111, rotating support shaft 110 and hydraulic lines 121 are identical to the prior art teachings of Faure U.S. Pat. No. 3,595,365. The apparatus operates in the same environment as FIGS. 1 with the same I.S. machine 101, I.S. conveyor 117, glassware 113 deposited upon a dead plate 115 of the I.S. conveyor and feeder drive 105. The feeder shaft 105, one of the synchronous pick off points of the I.S. machine 101, is connected to operate a signal generator, a mechanically driven clock 123 for generating electrical information whose frequency varies in direct proportion to the speed of the feeder electric motor shaft 105 whereof each signal represents one, one-hundredth of a degree of angular rotation or other acceptable smaller or larger increments.

Signals 125 produced by the generator 123, which may include pulses or impulses, are used by a controller 127. This controller 127 contains a read only memory chip(s) (ROMS) or in programmable memory form (PROMS) which is responsible for the position vs. time performance characteristic of the GDCA. An operator console 129 containing controls including switches enables an operator to feed information, among it being specific piston retraction information and also dead plate 115 delay time, into the controller 127 which automatically modifies the point of cylinder 109 piston retraction with respect to support shaft 119 swing position and modifies reorientation of the signal generator 123, respectively, or other GCDA functions.

Controller 127 output is fed to both hydraulic controls 131 for the hydraulic lines 121 to the cylinder 109 and to a digital stepping motor 133 through a typical motor drive card 135. The output shaft 137 of the digital stepping motor 133 is coupled to the support shaft 119 via a belt 139 drive or alternatively by direct coupling. The belt 139 drive includes pulleys 141, 143 which provide a 4 to 1 speed reduction. However, other reduction values may be used. The motor 133 is controlled to rotate in one direction, change direction and return to the initial position in repeatable fixed increments of rotation which may be either of constant or variable repetition period and may also include variations in repetition period during each operational cycle for changes in velocity during various portions of the support shaft 110 rotation.

Figure 5:
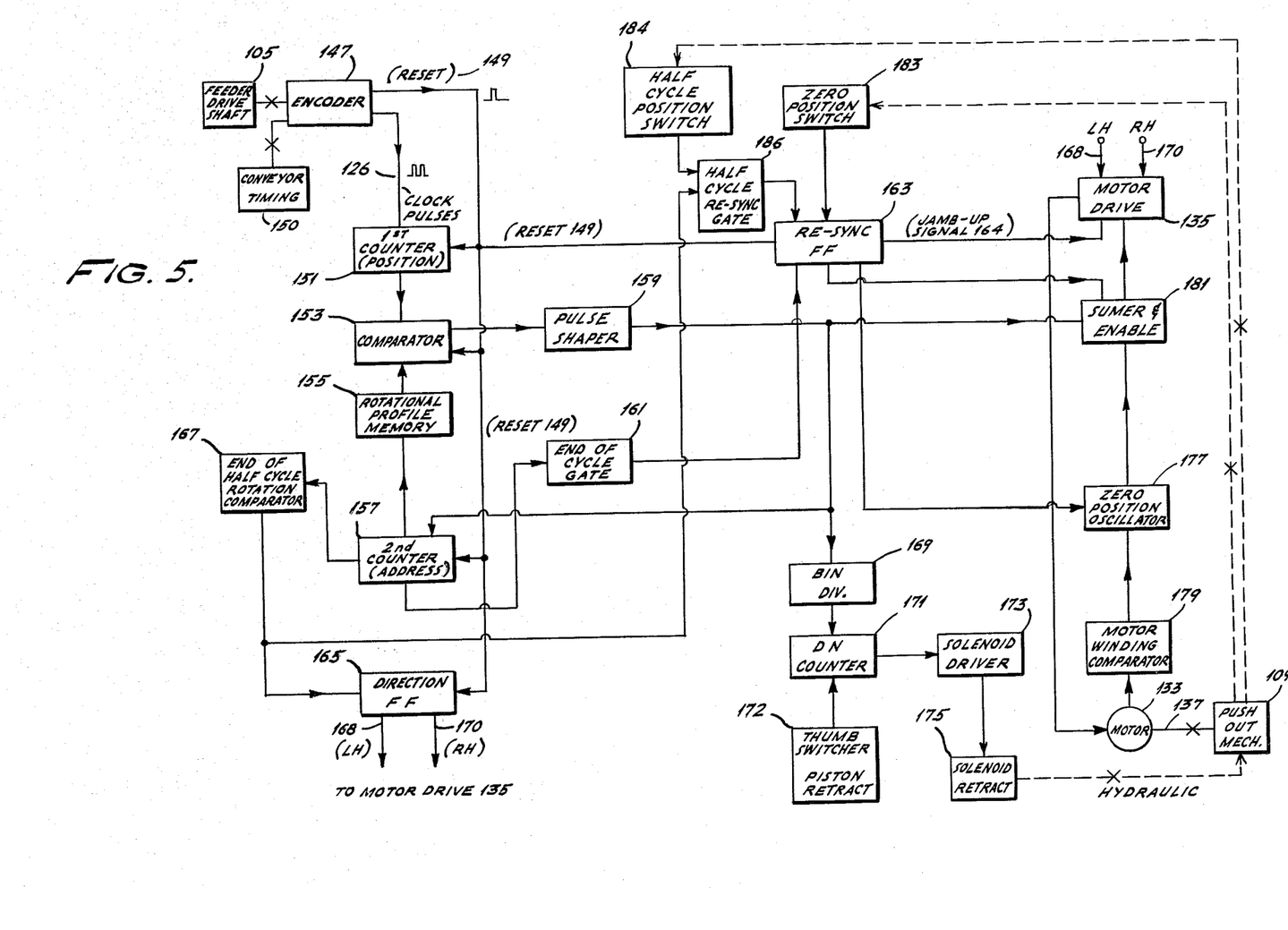
FIG. 5 is a block diagram of the electronic control and electric motor interconnection shown in FIG. 3.

The electrical and electronic features of FIG. 4 can be seen in greater detail in FIG. 5. The feeder drive shaft 105 is connected directly to an encoder 147 which implements the signal generator or clock 123 of FIG. 4. The encoder 147 alternately can be tied to any mechanical or electrical synchronization point of the I.S. machine 101. This encoder 147 provides an initiating or reset signal 149 and a train of clock pulses 126 whose count provides feeder shaft 105 position and, therefore, I.S. machine angular information, respectively. In computer controlled or other types of systems these timing pulses are already available and the encoder 147 may not be needed. The clock pulses 126 are fed to a first counter 151, the angular position counter, and a part of the controller 127 of FIG. 4. The output of this first counter 151 is connected to a comparator 153. The comparator 153 compares the first counter 151 output with information fed it from a rotational profile memory 155. This rotational profile memory 155 is a read only memory (ROM) or a programmable read only memory (PROM) which has been loaded or pre-programmed, respectively, with the rotational position vs. time information for the cylinder support shaft 110 providing identical operational characteristics to an ideal mechanical cam system. Alternately, any storage device whether analog or digital may provide substitute and equivalent functions of the (ROM) (PROM) 155. The rotational profile memory 155 is addressed by a second or address counter 157, which address counter 157 is in turn fed from the output of the comparator 153 via a pulse shaper 159.

A second output from the second or address counter 157 is fed to an end cycle gate 161 whose output is in turn fed to a re-synchronization flip-flop 163.

The memory 155 contains a series of values representing support shaft 110 position in relation to feeder drive shaft 105 and, therefore, I.S. machine position. The position counter 151, address counter 157, and comparator 153 operate in conjunction with the values programmed into the memory 155 to provide control pulse signals to the digital stepping motor 133 and the hydraulic control 131. Thus, the pushout cylinder 109 is caused to rotate, as well as its apparatus, here robot fingers 111. Alternate circuitry may be used to control extension or retraction of the cylinder 109 according to the information contained in the program memory 155. While this program is used to control the operation of the GCDA to duplicate the operation of an ideal mechanical cam action GCDA, other programs may be substituted when pushout shaft 110 operation is to be altered. An electronic modification of pushout rotation is thereby made possible. Such modification can be quickly and economically effected by a change in the stored program of the digital storage (PROM 155).

A third output from the second or address counter 157 is fed to a direction flip-flop 165 via an end of half cycle rotation comparator (counter) 167 which monitors for support shaft swing (half circle operation at delivery). Direction flip-flop 165 provides either left-hand drive 168 or right-hand drive 170 directional information to the motor drive card 135 causing the motor 133 to rotate clockwise or counter-clockwise from its initial or "home" dead plate 1.

A reset signal 149 from the encoder 147 which represents the initial or zero reference position of the IS machine, is connected to reset the first and second counters 151, 157 as well as the comparator 153 and the direction flipflop 165.

The output from the pulse shaper 159 is also fed to a divide by 11 binary divider 169 whose output is in turn fed to a down counter 171. The initial count in the down counter 171 is established by thumb switches 172 which essentially constitute the operator console 129 of FIG. 4. A "zero" count output from the down counter 171 is used to operate a solenoid driver 173 which controls the hydraulic retraction 175 for the pushout cylinder 109. The combination of the solenoid driver 173 and retraction control valve 175 constitute the hydraulic control element 131 of FIG. 4. The thumb wheels 172 enable an operator to set the angular position of the cylinder 109 where its piston begins to retract.

The resynchronization flipflop 163 provides output information to the motor drive card 135 and to a summer/enable gate 181. This summer/enable gate 181 receives pulses from the pulse shaper 159 and a zero position oscillator 177, which oscillator 177 is activated by a signal from the resynchronization flipflop 163 and a motor winding comparator 179. The reset signal 149 from the encoder 147 is also connected to the resynchronization flipflop 163.

Motor drive card 135 is connected directly to the digital stepping motor 133. The shaft 137 of this motor 133 is connected to the cylinder support shaft 110 via the timing belt and pulley 4 to 1 reduction described in connection with FIG. 3 above.

Left and right-hand rotational direction signals 168, 170 are, selectively, exclusively, each input to the motor drive card 135. A zero position sensing switch 183 tied to the cylinder support shaft 110 operates to provide yet another signal to the re-synchronization flip-flop 163. The zero position sensing switch 183 can be a Hall-effect detector with associative magnet or, alternately, photoelectric, mechanical gate or other unique position indicating device. This zero position switch operates in conjunction with the motor winding comparator 179 to control the zero position oscillator 177.

The end of half-cycle comparator 167 is also connected to the re-synchronization flip-flop 163 via a half-cycle re-synchronization gate 186. This gate 186 also receives an input from a half-cycle position switch 184 which is mechanically tied to the pushout 109 to indicate the physical position of that mechanical apparatus and loss of synchronization at half-cycle operation.

This circuit, FIG. 5, operates to provide clock pulses 126 which provide angular rotation of the feeder drive shaft 105 in increments of one one-hundredth of a degree of rotation. The counters 151 and 157, along with the comparator 153, rotation profile memory 155, end of half-cycle comparator 167, direction flip-flop 165, pulse shaper 159, end of cycle gate 161, recycle flip-flop 163, binary divider 169, down counter 171, zero position switch 183, summer enable element 181, zero position oscillator 177 and motor winding comparator 179 comprise the programmable controller 127 of FIG. 4.

Digital stepping motor 133 is connected to provide digital rotational increments of 0.36 degrees. With the 4 to 1 timing belt reduction via the pulleys 141, 143, the pushout shaft 119 rotates the pushout cylinder 109 in 0.09 degree steps. These parameters can be changed by accepted techniques. When a loss of synchronization is detected at end of half cycle rotation or at the "zero" position, the oscillator 177 is engaged to drive the pushout support shaft 110 to half cycle position or home (zero initial position), respectively.

This circuit provides accuracy and dependability of cylinder 109 position or angle of rotation with respect to time and carefully synchronizes pushout cylinder 109 as a function of the rotation of the feeder drive shaft 105. The circuit also provides the ability to correct out of synchronous operation at half-cycle and to reset to the correct initial position point within one cycle and without cumulative errors.

A conveyor timing control 150 located on an operator console 129 alters encoder synchronization to the IS machine 101 to change overall synchronization via electromechanical apparatus.

This camless electronic GCDA circuit provides an advantage over prior art mechanical, cam operated GCDA's in that accuracy is maintained over the entire range of operating speeds, whereas with the mechanical cam apparatus the same is not true and performance can vary between identical units and provide cumulative errors.

Figure 6:
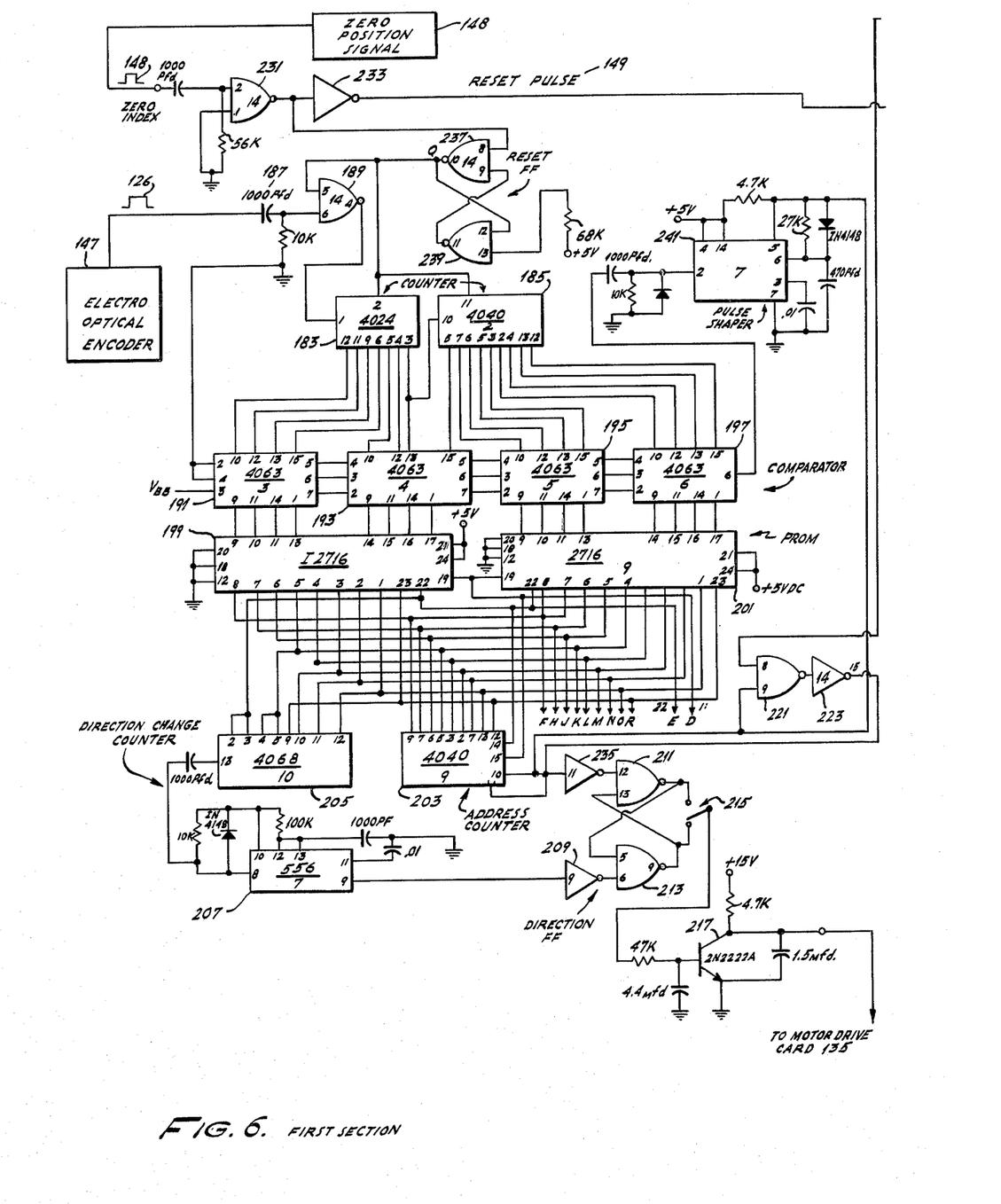
FIG. 6 is a schematic circuit of the electronic structure of FIG. 4.

FIG. 6 shows the schematic circuitry for the electronic GCDA, including a signal generating encoder 147. This device 147 may be an electro-optical encoder such as can be commercially obtained from Baldwin Electronics Incorporated, and is employed to provide signal wave-forms indicative of feeder drive shaft 105 rotation. A zero reference position signal 148 is received from the encoder 147 to indicate an initial or indexing point for the GCDA operation. Clock pulses 126 are fed from the encoder 147 to a counter comprised of serially connected RCA type CD 4024 and CD 4040 counter chips 183, 185. These pulses 126 arrive at the counter 183, 185 by passing through a 1000 pf capacitor 187 and a two input NAND gate 189. Serially connected counters 183, 185 implement the position counter 151 of FIG. 5. The comparator 153 comprises four serially connected RCA type CD 4063 comparator chips 191, 193, 195 and 197 while the rotational profile memory 155 is implemented by two Intel type I2716 programmable memories (PROMS) 199, 201, connected in series and to the comparators 191, 193, 195, 197. The plurality of identical components used in the circuit is needed as many components were designed for 4 to 8 bit words while the circuit at hand words with 16 bit words.

An RCA type CD 4040 counter 203 is used as the address register 157 for addressing the PROMS 199, 201. Also connected to this address counter 203 is the end of half cycle rotation comparator or change of direction counter implemented with an RCA type CD 4068 NAND chip counter 205 and National Semiconductor Corporation type 556 timer 207 connected to operate as a "one shot" on the output of the counter 205.

An output from the change of direction one shot 207 is connected through an inverter 209 to a pair of NAND gates 211, 213 which NAND gates 211, 213, operate as the direction flipflop 165 of FIG. 5. Here the output from the NAND gate 211 can be used to dictate left-hand operation, i.e., driving and stepping motor clockwise (clockwise, counter-clockwise direction being selectable), while the output from the other NAND gate 213 can be used for right-hand operation, i.e., driving the stepping motor 133 counterclockwise.

A switch 215 may select initial direction between the output of the NAND gates 211 and 213 for either left-hand or right-hand pushout operation.

The output from the switch 215 is fed through an amplifier circuit including transistor 217. The output from transistor 217 is fed to the motor drive card 135. The circuitry of this drive card 135 is well known in the art and commercially available. It should be understood that the attendant circuit interconnections of the components discussed above in connection with FIG. 6, as well as the components which will be discussed below, are made in accordance with manufacturers' specifications with pin connections, resistors and capacitors chosen according to manufacturer's user's manual or catalogue.

The zero position signal 148 provides a reset pulse 149 through a 1000 p.fd. capacitor 229, a NAND gate 231 and an inverter 233 directly to the memory address counter 203 and to the left-hand NAND gate 211 of the direction flip-flop through another inverter 235.

The reset pulse 149, in its inverted form, exits the NAND gate 231 and is fed to a reset flipflop comprising the NAND gates 237 and 239 whose output is fed to the clock NAND gate 189 to the counter chip 183.

The reset pulse 149 output from the inverter 233 is also connected to reset the counter chips 183 and 185.

The output from the comparator chip 197 is fed to a pulse shaper comprising a National Semiconductor Corporation type 556 timer connected as a one-shot 241. The output from this one-shot 241 is connected to the NAND gate 221 and to the address counter 203. The output from the pulse shaper, one-shot 241 is also connected to transistor 219 via gates 221, 223 and diode 225. The transistor 219 provides motor step drive to motor drive card 135.

An RCA type CD 4013 "D"-type flipflop 245 is utilized as the resynchronization flip-flop 163 of FIG. 5. This flipflop 245 receives a reset pulse 149 from the inverter 233 and is connected to a NOR gate 243, this NOR gate operating as the summer and enable 181 component, FIG. 5.

The pushout cylinder 109 position detector 183 is implemented by a Hall-effect position indicator 247 and associated magnet which indicates when the pushout cylinder 109 is at its initial or zero-"home" position. This Hall-effect indicator 247 has an output which is connected to a three input NAND gate 249 and to a second three input NAND gate 251. A third three input NAND gate 253 is interconnected with the second three input NAND gate 251 to form a flipflop with the first three input NAND gate 241 acting as an inverter input to the third NAND gate 253. The output from the paired NAND gates 251, 253 is inverted through a hex inverter 255 and then input into the resynchronization flipflip 245. The three input NAND gates 249, 251, 253 and the inverter 255 act as the zero position switch 183 of FIG. 5.

The end of cycle gate 161 of FIG. 5 is implemented by an 8 input NAND gate of the RCA type CD 4068, element 257, FIG. 6. This chip 257 is connected to the PROM chip 201. A hex inverter 259 connects the output from the end of cycle operation chip 257 to a two input NOR gate 261, which NOR gate 261 has its other input connected to the resynchronization flipflop 245 and is in parallel to the "summer and enable" NOR gate 243.

The output of the two input NOR gate 261 is connected to the gate 221 and is input to the "summer and enable" NOR gate 243. The "summer and enable" NOR gate 243 is connected to the motor drive card circuit 135 through a 47K Ohm resistor 263 and a type 2N2222A transistor 265.

The resynchronization flipflop 245 also drives the solenoid valve coil 175 via a Darlington type amplifier utilizing a 2N2222A transistor 267 and a 2N2219 transistor 269. These transistors 267, 269, as well as their attendant circuitry, implement the solenoid driver 173 of FIG. 5.

The motor winding comparator 179 of FIG. 5 is implemented by an 8 input NAND gate of the RCA type CD 4068, element 271 and diodes 274, voltage divider 273 and transistor 275. This chip 271 receives inputs directly from the motor 133 windings.

The output from the motor winding comparator chip 271 is input to an oscillator circuit. This oscillator circuit also receives an input from the resynchronization flipflop in parallel to the inputs to the NOR gates 243, 261. This oscillator 177 of FIG. 5 is of classical design, and the components thereof are available from such manufacturers as RCA, and comprises the NAND gates 273, 275, 277 and 279, as well as the attendant circuitry, including the variable resistor 281, the one meg Ohm resistance 283, the capacitors 285 and 287, and the diode 289 and 18K Ohm resistor 291. The output from the oscillator NAND gate 279 is input to transistor 219 via diode 227.

A pair of serially connected 4 bit comparators of the RCA type CD 4063 elements 293, 295 are connected to the memory chip 201 to implement to down counter 171 of FIG. 5. The gates of chip 201 chosen for direct interconnection from the memory chip 201 provide a binary divide by 11 function.

Operator manipulated binary-coded-decimal thumb wheel switches 172 are connected to the down counter chips 293, 295 through a BCD to binary converter 297. The thumb wheel switches 172 operate in binary-coded-decimal necessitating the utilization of a Texas Instruments Inc. type 74184 BCD to binary convertor 297.

The invention monitors electrical pulses provided by the electro-optical encoder 147 which is driven off the feeder drive shaft 105. These pulses are provided on each encoder revolution with one one-hundredth of a degree rotation information of the feeder drive shaft 105 movement. When a fixed number of pulses are received by the counter chips 183, 185 the circuit determines that the stepping motor 133 should be activated an additional step. This determination causes the addressing of the next location in the memory chips 199, 201 and comparing that "count" value with the count in the actual pulse counter chips 183, 185. If a correct comparison is made, the motor drive circuit 135 is activated via the pulse shaper 241 and "summer and enable" 243 circuits.

The direction change counter 205 monitors when a full end of half cycle rotation of the support shaft 110 has been accomplished via the monitoring of the incoming clock pulses 126 through the address counter 203 from the comparator 191, 193, 197, Hall-effect position indicator 247 and pulse shaper 241. The direction flipflop 211, 213 is then triggered to change the direction of rotation of the motor 133. The switch 215, of course, is provided so that the initial direction of rotation of the motor 133 may be clockwise or counter-clockwise. Regardless, the direction flipflop 211, 213 responds to the output of the change of direction comparator counter 205 and its one-shot 207 to change the then existing direction of rotation of the stepping motor 133.

The end of cycle operation gate 257 monitors the address counter 203 "count" to determine when an end of operational cycle occurs and activates the resynchronization flipflop 245.

The Hall-effect position indicator 247 determines that the support shaft 110 is within 1.8° of the zero or "home" position. On the last half-cycle (or return) the zero position oscillator 117, comprising the NAND gates 273, 275, 277, 279 and attendant circuitry, is utilized to drive the stepping motor 133 and return the support shaft 110 to the initial position.

The circuit of this invention not only operates the pushout cylinder 109 by activating its hydraulics at a predetermined time and also causes the pushout cylinder 109 to be pivoted from the dead plate 115 to the conveyor 117 and back, but also monitors the half swing operation as well as the initial zero position indexing of the swing, thereby determining whether the operation is in synchronization with the IS machine 101. Moreover, when a jamb-up is detected by the combined operation of the end of cycle gate 161, the zero position switch 183 and the resynchronization flipflip 163 provides a jamb-up signal to an oscillator commercially available on the motor drive card 135, this additional oscillator providing a signal to return the motor 133 to "home" until the Hall-effect detector (zero position switch 183) initiates the normal procedure of searching for "home" or zero position.

Figure 7:
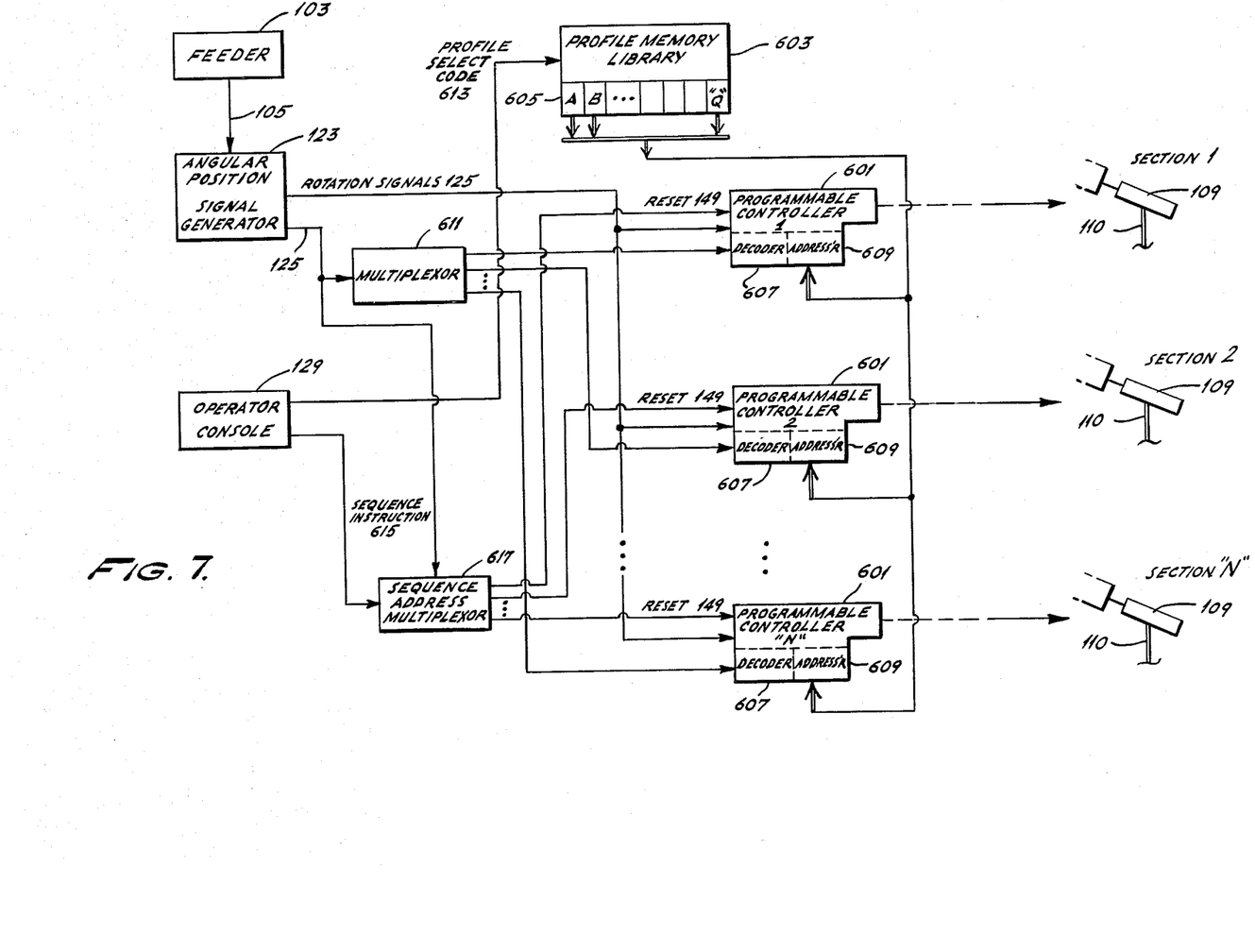
FIG. 7 is a block diagram of an "n" section programmable electronic GCDA of individual programmable electronic GCDA units.

The individual programmable electronic GCDA units described above can be ganged to operate a multiple section machine such as the "n" section GCDA of FIG. 7.

Duplicate programmable controllers 601, FIG. 7, are connected, one each, to duplicate motor drive cards 135 and duplicate digital stepping motors 133 for controlling identical pushout cylinders 109. Each programmable controller 601 will operate independently from an identical set of instructions stored in a program memory. The controllers 601 differ from the previously described programmable controllers 127 only in that an individual memory chip 155 is not used with each controller 601 but is located at a disparate point in a profile memory library 603. In this regard, only the physical location of the profile memory 605 differs from the electrical structure of the present controller 601 and the previous controller 127 structure. Of course, some hardware has been added to permit time-shared access of each individual controller circuit 601 to the shared profile memory 605, but the control functions of each controller 601 remain identical to the previous controllers 127.

Each shared memory programmable controller 601 contains a multiplex instruction decoder 607 and a shared memory addresser 609.

The IS machine drive shaft 105 is connected to an angular position signal generator 123 for producing angular rotation signals 125 to each programmable controller 601 just as with the previous circuit of FIG. 4.

In this circuit, FIG. 7, however, these rotation signals 125 are also fed to a multiplexer 611 which "time" distributes these signals to the decoder 607 of each controller 601.

The operator console 129 provides a profile select code 613 to the profile memory library 603 for making one of the stored "A" through "Q" profile memory libraries 605 held there. These profile memories are identical to the memory 155 of FIG. 5, differing only in that different information is stored in each memory 605 location defining the various profiles "A" through "Q".

In response to the profile select code 613, one of the profile memories 605 is made available to the multichannel connection with each controller addresser 609.

The operator console 129 also provides a sequence instruction 615 to a sequence addresser 617. The sequence addresser 617 receives signals 125 from the signal generator 123 and distributes reset pulses 149 to each controller 601 on a time sequence basis. The alternate operation of each section 1 through "n" is thereby timed or sequenced.

Figure 8A:
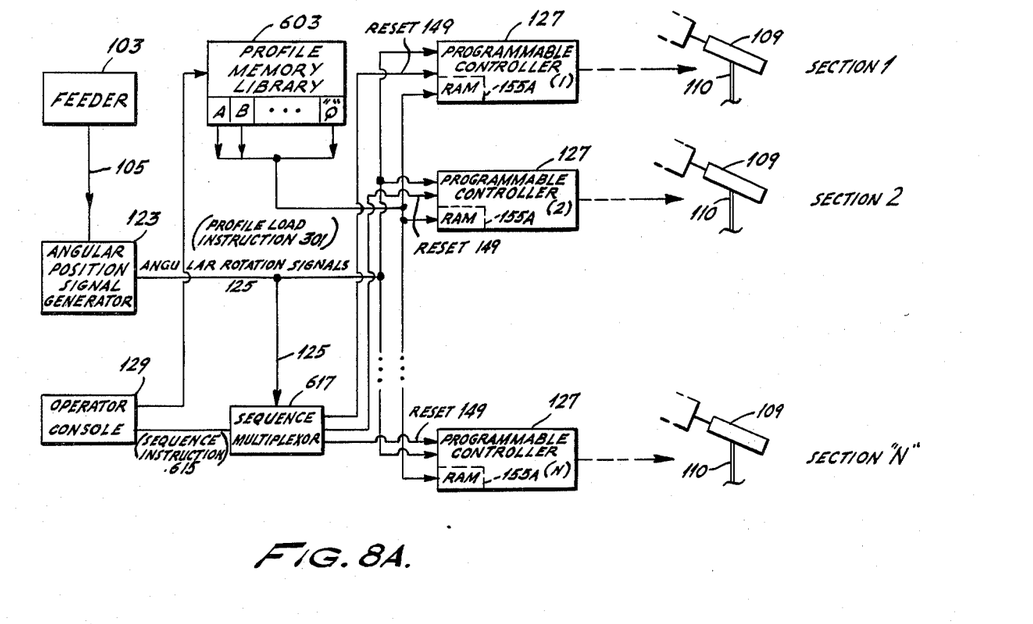
FIG. 8a is a block diagram for an alternate profile scheme for the "n" section system of FIG. 7.

An alternate profile memory scheme to that of the circuit of FIG. 7 is shown in FIG. 8a. Here the programmable controllers 127 are each identical to the programmable controller 127 of FIGS. 4, 5 and 6 except that the profile memory 155 is not a PROM or ROM but a random access memory (RAM) 155A which is loaded with profile information from the profile memory 603 holding a plurality of different profiles 605.

Upon a profile load instruction 301 from the operator console, one of the memory profiles "A"]through "Q", depending upon the particular instruction, is loaded into each of the RAM's 155A. This instruction 301 procedure is only used when the character of operation of each individual GCDA ((1) through ("n")) is to be automatically changed.

With the exception of having a new profile 605 loaded into its RAM 155A, each electrically controlled and electrically operated GCDA forming multi-section operation operates completely independently, the one additional exception to this being that each individual GCDA's operation is sequenced by time sequenching individual reset signals 149 to each individual controller 127.

The time sequencing of each section GCDA for a multi-section system is carried out as with the circuit of FIG. 7. A sequence multiplexor 617 receives an instruction 615 from the operator console defining the order of operation of each section (1 through "n") GCDA. This sequencing is controlled by the timed-distribution of a reset signal 149 to each controller 127.

Figure 8B:
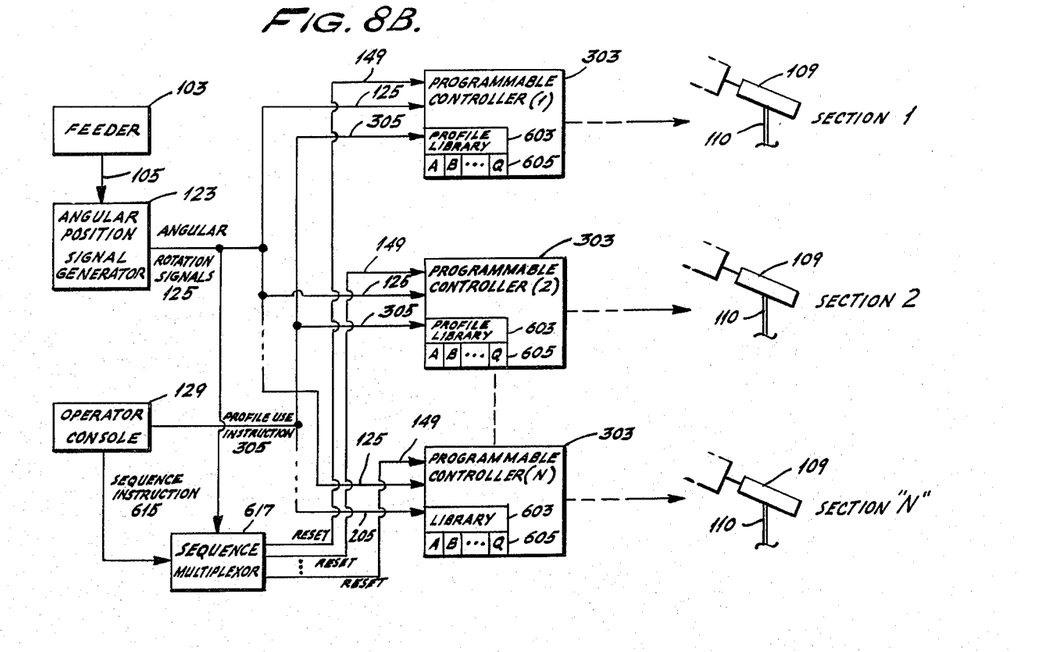
FIG. 8b is a block diagram for another profile memory scheme for the "n" section system of FIG. 7.

Another profile memory scheme to that of the circuit of FIG. 7 is shown in FIG. 8b. Here the feeder 103, drive shaft 105, angular position signal generator 123, signals 125, operator console 129, sequence multiplexor 617, sequence instructions 615, time-sequenced plural reset signals 149 are as described above in connection with FIG. 8a. However, the plurality of identical programmable controllers 303 differ from those previous controllers 127 with their loadable RAM's 155A, in that each controller 303 here contains its own profile memory 603 comprising the profiles (A) through (Q) 605, each being stored in separate individual ROMS or PROMS which can be identical to the memory 155. The operator console 129 provides a profile use instruction 305 to each controller 303 library 603 to make a particular memory 155 hold profile 605 out of the controller 303 until changed. This scheme provides the advantage with duplication of memories 155 and profiles 605 that a loss of a memory component in one controller 303 section will not impair or inhibit operation of other controller 303 sections (1) through (n).

Many changes can be made in the above-described electrically driven, electronically controlled pushout structure without departing from the intent and scope thereof. Modifications can be made which provide electronic camless operation and which are within the scope of the present invention. It is intended, therefore, that all matter contained in the above description and shown in the accompanying drawings be interpreted as illustrative and not be taken in the limiting sense.

What is claimed:

1. A camless electronic glassware conveyor delivery apparatus (GCDA) having pushout robot means being in operative association with glassware forming apparatus having at least one synchronous operation point, comprising:
   camless electronic means responsive to said synchronous point for electronically controlling said pushout robot rotational operation including a digital stepping motor operatively coupled to rotate said pushout robot, said motor speed being varied with pulse signals which vary according to a stored program; and
   means for electronically altering said pushout robot rotational operation by changing said stored program, said altering means being connected to said controlling means.

2. The apparatus of claim 1 also including means for electronically correcting for loss of pushout robot operation synchronization with said glassware forming apparatus operation, said synchronization correcting means being connected to said controlling means.

3. The apparatus of claim 2 also including means for electronically correcting for loss of initial position reference, said reference correcting means being connected to said controlling means.

4. The apparatus of claim 1 wherein said controlling means includes:
   means responsive to said synchronous point for providing electrical information representing cyclic glassware forming apparatus operation in angular degrees;
   electric motor operated pushout robot means; and
   means for providing control signals to drive said electric motor operated robot means, said control signal providing means utilizing said electrical information provided from said electrical information providing means and being connected thereto.

5. The apparatus of claim 3 wherein said electric motor operated pushout robot means includes:
   an electric motor connected to said control signal providing means and being responsive thereto;
   pushout cylinder robot means; and
   means for transferring said electric motor power to said pushout cylinder robot means.

6. The apparatus of claim 5 wherein said pushout cylinder robot means includes a pushout cylinder, robot attachments mounted to said cylinder piston, and a support shaft for holding and rotating said cylinder.

7. The apparatus of claim 6 wherein said control signal providing means has a memory containing said support shaft time-position instructions.

8. The apparatus of claim 3 wherein said controlling means includes:
   means responsive to said synchronous point for providing electrical information representing cyclic glassware forming apparatus operation in angular degrees;
   electric motor operated pushout robot means; and
   means for providing control signals to drive said electric motor operated robot means, said control signal provided means utilizing said electrical information provided from said electrical information providing means and being connected thereto.

9. The apparatus of claim 8 wherein said electric motor operated pushout robot means includes:
   an electric motor connected to said control signal providing means and being responsive thereto;
   pushout cylinder robot means; and
   means for transferring said electric motor power to said pushout cylinder robot means.

10. The apparatus of claim 9 wherein said pushout cylinder robot means includes a pushout cylinder, robot attachments mounted to said cylinder piston, and a support shaft for holding and rotating said cylinder.

11. The apparatus of claim 10 wherein said control signal providing means includes a memory containing said support shaft time-position instructions.

12. The apparatus of claim 11 also including:
    plural additional identical said electric motors;
    plural additional identical said pushout cylinder robot means;
    plural additional identical said transfer means, each said additional transfer means connecting a separate one of said additional electric motors to a separate one of said additional pushout cylinder robot means; and
    plural additional identical said control signal providing means, one each connected to a separate one of said additional electric motors, each said additional control signal providing means utilizing said electrical information provided from said electrical signal providing means.

13. The apparatus of claim 12 also including means for initiating operative cycles individually for each said control signal providing means.

14. The apparatus of claim 13 wherein said operative cycle initiating means provides a sequence of operation instruction.

15. The apparatus of claim 14 wherein said operative cycle initiating means includes an operator console said console providing said sequence instruction to said plural control signal providing means.

16. The apparatus of claim 10 wherein said transferring means includes a forward drive and reverse drive clutch structure, said clutch structure connecting said electric motor shaft and said support shaft.

17. The apparatus of claim 16 wherein said control signal providing means includes a start relay tied to said electrical signal, and an electronic motor speed controller connected to said start relay and to said electric motor.

18. The apparatus of claim 17 wherein said pushout cylinder piston is hydraulically operated including hydraulic valve controls and wherein said synchronization correcting means includes an end of half cycle rotation indicator, said half cycle indicator being connected to engage said reverse clutch and operate said hydraulic valve controls responsive to support shaft position.

19. The apparatus of claim 18 wherein said reference correcting means includes an end of cycle home position indicator, said home position indicator being responsive to support shaft position and being connected to disengage said reverse clutch and said electronic motor speed controller.

20. The apparatus of claim 10 wherein said electrical information providing means includes a profile encoder connected to said synchronous point.

21. The apparatus of claim 20 wherein electric motor is a digital stepping motor, said stepping motor including a motor drive card connected thereto.

22. The apparatus of claim 21 wherein said profile encoder provides angular time-position signals, a direction signal and a reset signal output distinct from one another.

23. The apparatus of claim 22 wherein said control signal providing means includes a first pulse shaper connected to said profile encoder with time-position signl output therefrom, a first amplifier connected to said first pulse shaper, said first amplifier output being tied to said motor drive card, a second pulse shaper tied to said profile encoder direction signal output, a direction flip-flop connected to said second pulse shaper output and a second amplifier connected to said direction flip-flop, said second amplifier output being tied to said motor drive card.

24. The apparatus of claim 23 wherein said pushout cylinder piston is hydraulically operated including hydraulic valve controls, said down counter retract signal output being connected to said hydraulic valve controls and wherein said control signal providing means also includes a left hand-right hand operation selector connected to said direction flip-flop.

25. The apparatus of claim 24 wherein said synchronization correcting means includes a down counter connected to said first pulse shaper output and providing an output control signal to said hydraulic valve controls, and an operator console connected to load a cycle retraction code into said down counter.

26. The apparatus of claim 25 wherein said reference correcting means includes a zero position indicator connected to said support shaft, a resynchronization flip-flop connected to said digital stepping motor and said zero position indicator, a third pulse shaper connected to said profile encoder reset signal output and providing an output to said resynchronization flip-flop, said resynchronization flip-flop having an output connected to said first amplifier.

27. The apparatus of claim 26 wherein said profile encoder includes an electro-optical timing disk said timing disk containing a plurality of timing slots and being connected to said synchronization point to rotate in synchronism thereto, a light source and a detector positioned to detect light passing through said disk slots, said detector providing said time-position signals, direction signal and reset signal outputs.

28. The apparatus of claim 7 wherein memory contents is rotational profile information.

29. The apparatus of claim 28 wherein said rotational profile memory information is electronically accessible.

30. The apparatus of claim 29 wherein said electric motor is a digital stepping motor, said stepping motor including a motor drive said connected thereto, said motor drive card, receiving said control signals from said electronic memory control signal providing means.

31. The apparatus of claim 30 wherein said pushout cylinder piston is hydraulically operated including hydraulic valve controls, said hydraulic valve controls being connected to said control signal providing means.

32. The apparatus of claim 31 wherein said electronic memory control signal providing means is a programmable controller.

33. The apparatus of claim 32 also including an operator console connected to said programmable controller.

34. The apparatus of claim 33 wherein said programmable controller includes said synchronization correcting means and said reference correcting means functions.

35. The apparatus of claim 34 wherein said programmable controller includes an encoder connected to said synchronization point, said encoder providing a clock pulse output and a reset output, a first counter connected to said clock pulse output, a comparator connected to said first counter and to said rotational profile information memory, a pulse shaper connected to said comparator output, a binary divider connected to said pulse shaper, a down counter tied to said binary divider output, thumb wheel switches connected for setting said down counter, a solenoid driver connected to said down counter output said solenoid drive also being connected to said hydraulic valve controls, a second counter connected to said pulse shaper output said second counter output being tied to said rotational profile information memory, and a summer and enable component connected between said pulse shaper output and said motor drive card.

36. The apparatus of claim 35 wherein said rotational profile information memory is a read only memory (ROM).

37. The apparatus of claim 36 wherein said rotational profile information memory is a programmable read only memory (PROM).

38. The apparatus of claim 37 wherein said synchronization correcting means function includes an end of half cycle rotation comparator connected to said second counter, a direction flip-flop connected to said end of half cycle rotation comparator, said direction flip-flop being connected to said motor drive card, a half cycle resynchronization gate tied to said end of half cycle rotation comparator, a half cycle position switch connected to input to said half-cycle resynchronization gate and receiving an input from said support shaft position, a resynchronization flip-flop connected to the output of said half-cycle resynchronization gate, and an end of cycle gate connected to said second counter, said resynchronization flip-flop receiving inputs from said end of cycle gate and said half-cycle resynchronization gate, said resynchronization flip-flop providing a jamb up signal to said motor drive card.

39. The apparatus of claim 38 wherein said encoder reset output is connected to said first counter, said resynchronization flip-flop, said comparator, said second counter and said direction flip-flop.

40. The apparatus of claim 39 wherein said reference correcting means function includes a motor winding comparator connected to said digital stepping motor, a zero position oscillator connected to said motor winding comparator and said resynchronization flip-flop, said zero position oscillator providing signals to said summer and enable component, and a zero position switch receiving an input from said support shaft position and providing an output to said resynchronization flip-flop.

41. The apparatus of claim 15 wherein said plurality of control signal providing means are a plurality of programmable controllers each connected to operate a separate one of said plural electric motors.

42. The apparatus of claim 41 wherein said electrical information providing means includes an angular position signal generator connected to said synchronization point, said signal generator output being connected to each of said programmable controllers.

43. The apparatus of claim 42 also including a sequence address multiplexor, said multiplexor receiving said sequence instruction from said operator console and providing individual inputs to each said programmable controllers, said multiplexor also being connected to said signal generator output.

44. The apparatus of claim 43 wherein said programmable controller operates responsive to said memory containing stored rotational profile information.

45. The apparatus of claim 44 wherein each said programmable controller time shares a single said memory.

46. The apparatus of claim 45 wherein said memory is a programmable read only memory (PROM).

47. The apparatus of claim 46 wherein each said programmable controller contains a decoder and an addressor, each said addressor being connected to said (PROM).

48. The apparatus of claim 47 also including a second multiplexor, this multiplexor having an input from said signal generator and providing individual output connections to each said programmable controller decoder.

49. The apparatus of claim 48 also including a library of rotational profile memories (PROMs) each said memory being substitutable into connection to each programmable controller addressor for a previously connected one, said programmable read only memory (PROM) being a part of said library, said connection being controllable in response to a profile select code from said operator console.

50. The apparatus of claim 43 wherein each said programmable controller includes a random access memory (RAM) capable of holding said rotational profile information.

51. The apparatus of claim 50 also including a library of rotational profile-memories, each said memory holding a different rotational profile.

52. The apparatus of claim 51 wherein the information from one of said library memories is loadable into each programmable controller RAM responsive to a load instruction input to said library from said operator console.

53. The apparatus of claim 43 wherein each said programmable controller contains a library of memories, each said memory containing different rotational profile information.

54. The apparatus of claim 53 wherein each library is identical among the programmable controllers.

55. The apparatus of claim 54 including a profile use instruction connection from said operator console to each said library in each said programmable controller, said instruction being usable to make one of said library memories actively a part of each said programmable controller at a time.

56. The apparatus of claim 55 wherein an indentical memory containing an identical rotational profile is capable of being made an active part of each said programmable controller at any one time.

57. The apparatus of claim 56 wherein said memories in said libraries are each programmable read only memories (PROMs).

58. The apparatus of claim 57 wherein said memories in said libraries are each read only memories (ROMs).

* * * * *

UNITED STATES PATENT AND TRADEMARK OFFICE
CERTIFICATE OF CORRECTION

PATENT NO. : 4,313,750

DATED : February 2, 1982

INVENTOR(S) : Donald A. Lulejian, Alphonse W. Faure, Eugene F. Fijalkowski

It is certified that error appears in the above-identified patent and that said Letters Patent are hereby corrected as shown below:

Col. 1, line 41: "transversed" should be --traversed--

Col. 8, line 64: "words" second occurrence should be --works--

Col. 11, line 25: "117" should be --177--

Col. 12, line 38: "]" should be deleted

Col. 12, line 45: "electrically" should be --electronically--

Col. 12, line 49: "sequenching" should be --sequencing--

Signed and Sealed this

First Day of June 1982

[SEAL]

Attest:

GERALD J. MOSSINGHOFF

Attesting Officer · Commissioner of Patents and Trademarks

UNITED STATES PATENT AND TRADEMARK OFFICE
CERTIFICATE OF CORRECTION

PATENT NO. : 4,313,750

DATED : February 2, 1982

INVENTOR(S) : Donald A. Lulejian, Alphonse W. Faure, Eugene F. Fijalkowski

It is certified that error appears in the above-identified patent and that said Letters Patent is hereby corrected as shown below:

Col. 13, line 60: In claim 5, change the number "3" to "4".

Signed and Sealed this

Twenty-eighth Day of June, 1988

Attest:

DONALD J. QUIGG

Attesting Officer

Commissioner of Patents and Trademarks